United States Patent
Wang et al.

(10) Patent No.: US 9,706,433 B2
(45) Date of Patent: Jul. 11, 2017

(54) APPARATUS AND METHOD FOR ACCESSING UNLICENSED BAND WITH NETWORK ASSISTANCE

(75) Inventors: Haifeng Wang, Shanghai (CN); Kari Rikkinen, Ii (FI); Ning Zhang, Shanghai (CN); Ting Zhou, Shanghai (CN); Jing Xu, Shanghai (CN); Wei Zou, Shanghai (CN); Zhenhong Li, Shanghai (CN); Jinling Du, Shanghai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 45 days.

(21) Appl. No.: 14/390,968

(22) PCT Filed: Apr. 5, 2012

(86) PCT No.: PCT/CN2012/073551
§ 371 (c)(1),
(2), (4) Date: Oct. 6, 2014

(87) PCT Pub. No.: WO2013/149387
PCT Pub. Date: Oct. 10, 2013

(65) Prior Publication Data
US 2015/0350949 A1  Dec. 3, 2015

(51) Int. Cl.
*H04W 28/02* (2009.01)
*H04L 12/801* (2013.01)
(Continued)

(52) U.S. Cl.
CPC ......... *H04W 28/0289* (2013.01); *H04L 47/12* (2013.01); *H04W 16/14* (2013.01); *H04W 48/10* (2013.01); *H04W 72/082* (2013.01)

(58) Field of Classification Search
None
See application file for complete search history.

(56) References Cited

U.S. PATENT DOCUMENTS

| | | |
|---|---|---|
| 2006/0234766 A1 | 10/2006 | Gillin et al. |
| 2008/0107095 A1 | 5/2008 | Black et al. |

(Continued)

FOREIGN PATENT DOCUMENTS

CN  101155385 A  4/2008

*Primary Examiner* — Kouroush Mohebbi
(74) *Attorney, Agent, or Firm* — Oblon, McClelland, Maier & Neustadt, L.L.P.

(57) ABSTRACT

From a plurality of messages provided by at least a first license-exempt access node which give usage information for the at least one channel in license-exempt radio spectrum, there is derived channel-specific statistical traffic information. This information for the channel is then provided to a second access node that controls licensed radio spectrum. Or in another embodiment the second access node can get this information by sensing and measuring the channel itself. The second access node retrieves this information from its local memory and sends on the licensed radio spectrum a downlink message having contents, determined from the channel-specific statistical traffic information, for aiding a user equipment UE to access the channel with a probability defined by the contents. The UE receives this message, extracts the contents, and attempts to access that channel in the license-exempt radio spectrum utilizing the defined probability.

20 Claims, 15 Drawing Sheets

(51) Int. Cl.
*H04W 72/08* (2009.01)
*H04W 16/14* (2009.01)
*H04W 48/10* (2009.01)

(56) References Cited

U.S. PATENT DOCUMENTS

| | | | |
|---|---|---|---|
| 2011/0287794 A1 | 11/2011 | Koskela | |
| 2013/0078924 A1* | 3/2013 | Choudhury | H04W 16/14 455/62 |
| 2014/0086187 A1* | 3/2014 | Kang | H04L 5/0051 370/329 |

* cited by examiner

402: WLAN Usage Information

| Signaling Contents | Length | Remarks |
|---|---|---|
| BSSID | 48bits | |
| Operation region | Varies length | Only delivered when "ISM DB" first discover the WLAN AP. |
| Channel number/ Central frequency | 5 bits | Only delivered when this field changes. |
| Traffic arrival rate( ē packets per sec) | Varies length | |
| Idle period length histogram info | Varies length | |
| Necessary PHY info(Optional as an enhancement) | Varies length | Help for LTE devices quickly demodulate the PHY preamble and header of WLAN frames. |

410 — BSSID
411 — Operation region
412 — Channel number/ Central frequency
413 — Traffic arrival rate
414 — Idle period length histogram info
415 — Necessary PHY info

Figure 4B

502: ISM Measurement Report

| Signaling Contents | Length |
|---|---|
| Channel No./Central frequency | 5bits |
| Usage percentage level | 3bits |
| Channel No./Central frequency | 5bits |
| Usage percentage level | 3bits |
| ...... | ...... |

510A — Channel No./Central frequency
511A — Usage percentage level
510B — Channel No./Central frequency
511B — Usage percentage level

Figure 5B

506: ISM Access Control

| Signaling Contents | Length |
|---|---|
| Channel No./Central frequency | 5bits |
| Access probability | 6bits |
| Occupancy time | 15bits (indicate maximum 32ms) |
| Other pre-scheduled control info (such as frequency and time divided info) | Various |
| WLAN AP's channel No. and the PHY header's MCS (Optional as an enhancement) | Various |

520 — Channel No./Central frequency
521 — Access probability
522 — Occupancy time
523 — Other pre-scheduled control info (such as frequency and time divided info)
524 — WLAN AP's channel No. and the PHY header's MCS (Optional as an enhancement)

Figure 5C

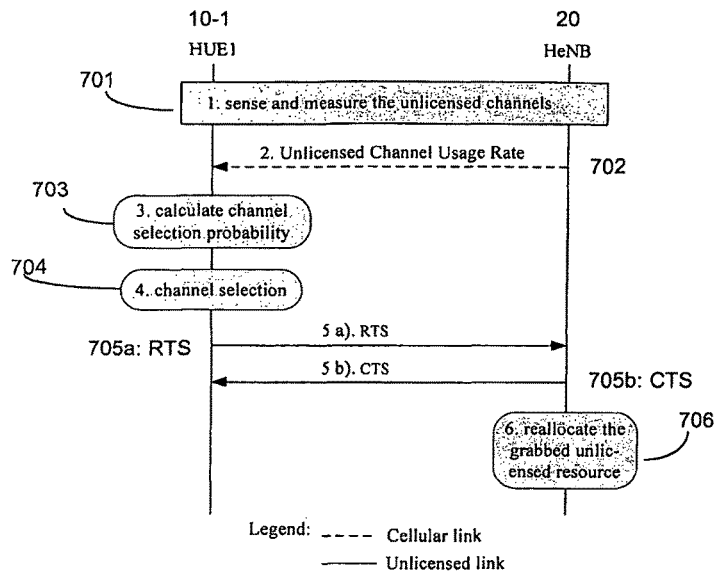
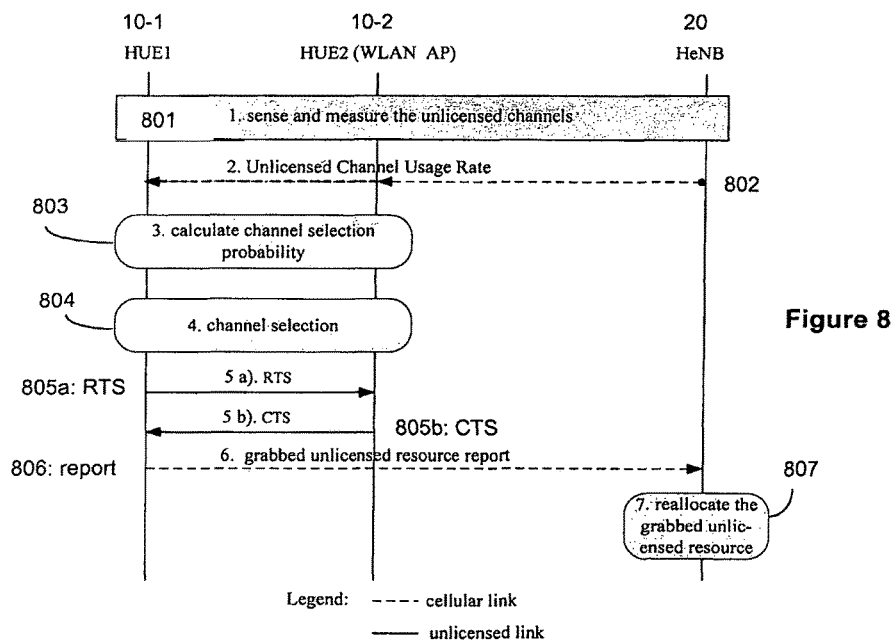

APPARATUS AND METHOD FOR ACCESSING UNLICENSED BAND WITH NETWORK ASSISTANCE

TECHNICAL FIELD

The exemplary and non-limiting embodiments of this invention relate generally to wireless communication systems, methods, devices and computer programs, and more specifically relate to accessing unlicensed radio spectrum, for example for offloading traffic from a cellular system that uses licensed spectrum.

BACKGROUND

More users and more data-intensive uses are hosted by cellular radio systems such as for example 3G and 4G radio access technologies (RATs). It is anticipated that continued efficiency improvements will not be able to keep up with the increase in data throughput and so there has been recent research into exploiting license exempt bandwidth to meet the increasing demand. Commonly the license exempt bandwidth is referred to as the Industrial, Scientific and Medical (ISM) band and/or television whitespaces (TV WS) or more generically the shared band(s), though these are not exhaustive.

The wireless local area network (WLAN) family of standards (commonly the RATs specified by IEEE 802.11b/g/n) typically use an access point (AP) which aids in coordinating access of the ISM band by individual users to minimize interference which is wasteful of the limited bandwidth. Different nations define the ISM band a bit differently but for WLAN the 2.4 GHz ISM band is generally divided into multiple overlapped channels. For example, in China and Europe (excluding Spain and France) the 2.4~2.4835 GHz band is divided into 13 channels each with a bandwidth of 22 MHz, which support 3 orthogonal channels at the same time.

Cellular network operators (licensed band) in many regions of the world are seeking to offload some of their traffic to the license exempt band by setting up their own WLAN Aps, particularly in cities where data usage is densely packed. But to successfully offload traffic from the licensed to the license exempt band there needs to be some coordination or common understanding so that all users, cellular offload as well as conventional WLAN stations (STAs), can efficiently access the channel without undue interference to one another.

SUMMARY

In a first exemplary embodiment of the invention there is a method for controlling a database system, comprising: for at least one channel in license-exempt radio spectrum, deriving channel-specific statistical traffic information from a plurality of messages provided by at least a first license-exempt access node which give usage information for the at least one channel; and providing to a second access node that controls licensed radio spectrum the channel-specific statistical traffic information for the at least one channel in the license-exempt radio spectrum.

In a second exemplary embodiment of the invention there is an apparatus for facilitating coexistence. The apparatus comprises at least one memory including computer program code and at least one processor. The at least one memory with the computer program code is configured with the at least one processor to cause the apparatus to perform: for at least one channel in license-exempt radio spectrum, deriving channel-specific statistical traffic information from a plurality of messages provided by at least a first license-exempt access node which give usage information for the at least one channel; and providing to a second access node that controls licensed radio spectrum the channel-specific statistical traffic information for the at least one channel in the license-exempt radio spectrum.

In a third exemplary embodiment of the invention there is a computer readable memory tangibly storing a set of instructions which, when executed on a coexistence database system causes the coexistence database system to perform the steps of for at least one channel in license-exempt radio spectrum, deriving channel-specific statistical traffic information from a plurality of messages provided by at least a first license-exempt access node which give usage information for the at least one channel; and providing to a second access node that controls licensed radio spectrum the channel-specific statistical traffic information for the at least one channel in the license-exempt radio spectrum.

In a fourth exemplary embodiment of the invention there is an apparatus for facilitating coexistence. In this embodiment the apparatus comprises computing means and communication means. The computing means is for deriving, for at least one channel in license-exempt radio spectrum, channel-specific statistical traffic information from a plurality of messages provided by at least a first license-exempt access node which give usage information for the at least one channel. The communication means is for providing to a second access node that controls licensed radio spectrum the channel-specific statistical traffic information for the at least one channel in the license-exempt radio spectrum. In exemplary embodiments the computing means may be one or more processors, a chipset, an integrated circuit with logic circuitry, and the like; while the communication means may be a transmitter, a transceiver, circuitry related to transmitting, or an output that provides a signal to a transmitter.

In a fifth exemplary embodiment of the invention there is a method for operating a wireless network access node comprising: retrieving from a local memory channel-specific statistical traffic information for at least one channel in license-exempt radio spectrum; and compiling for transmission on licensed radio spectrum a downlink message having contents determined from the channel-specific statistical traffic information for aiding a user equipment to access the at least one channel with a probability defined by the contents.

In a sixth exemplary embodiment of the invention there is an apparatus for use in a wireless network access node comprising: at least one memory including computer program code and at least one processor. In this embodiment the at least one memory with the computer program code is configured with the at least one processor to cause the apparatus to perform: retrieving from a local memory channel-specific statistical traffic information for at least one channel in license-exempt radio spectrum; and compiling for transmission on licensed radio spectrum a downlink message having contents determined from the channel-specific statistical traffic information for aiding a user equipment to access the at least one channel with a probability defined by the contents.

In a seventh exemplary embodiment of the invention there is a computer readable memory comprising a set of instructions, which, when executed on a wireless network access node causes the wireless network access node to perform the steps of: retrieving from a local memory channel-specific statistical traffic information for at least one channel in license-exempt radio spectrum; and compiling for transmission on licensed radio spectrum a downlink message having contents determined from the channel-specific statistical traffic information for aiding a user equipment to access the at least one channel with a probability defined by the contents.

In an eighth exemplary embodiment of the invention there is an apparatus for use in a wireless network access node comprising retrieving means and compiling means. The retrieving means is for retrieving from a local memory channel-specific statistical traffic information for at least one channel in license-exempt radio spectrum. The compiling means is for compiling for transmission on licensed radio spectrum a downlink message having contents determined from the channel-specific statistical traffic information for aiding a user equipment to access the at least one channel with a probability defined by the contents. In exemplary embodiments the retrieving means may be one or more processors whether or not specifically a memory controller, a chipset, an integrated circuit with logic circuitry, and the like; while the compiling means may be a transmitter, a transceiver, circuitry related to transmitting, or an output that provides a signal to a transmitter, or even a processor as noted above.

In a ninth exemplary embodiment of the invention there is a method for operating a user equipment comprising: extracting contents of a downlink message received on licensed radio spectrum, the contents defining a probability for accessing at least one channel in a license-exempt radio spectrum; and attempting to access at least the one channel utilizing the defined probability.

In a tenth exemplary embodiment of the invention there is an apparatus for use in a user equipment comprising: at least one memory including computer program code and at least one processor. In this embodiment the at least one memory with the computer program code is configured with the at least one processor to cause the apparatus to perform: extracting contents of a downlink message received on licensed radio spectrum, the contents defining a probability for accessing at least one channel in a license-exempt radio spectrum; and attempting to access at least the one channel utilizing the defined probability.

In an eleventh exemplary embodiment of the invention there is a computer readable memory comprising a set of instructions, which, when executed on a user equipment causes the user equipment to perform the steps of extracting contents of a downlink message received on licensed radio spectrum, the contents defining a probability for accessing at least one channel in a license-exempt radio spectrum; and attempting to access at least the one channel utilizing the defined probability.

In a twelfth exemplary embodiment of the invention there is an apparatus for use in a user equipment comprising computing means and communication means. In this embodiment the computing means is for extracting contents of a downlink message received on licensed radio spectrum, the contents defining a probability for accessing at least one channel in a license-exempt radio spectrum; and the communication means is for attempting to access at least the one channel utilizing the defined probability. In exemplary embodiments the computing means may be one or more processors, a chipset, an integrated circuit with logic circuitry, and the like; while the communication means may be a transmitter, a transceiver, circuitry related to transmitting, or an output that provides a signal to a transmitter.

BRIEF DESCRIPTION OF THE DRAWINGS

FIGS. 4B-C illustrate exemplary fields for the respective WLAN channel Usage Information message and the ISM Information Response message which are shown at FIG. 4A.

FIGS. 5B-C illustrate exemplary fields for the respective ISM Measurement Report and the ISM Access Control message which are shown at FIG. 5A.

FIGS. 6-8 are also used to illustrate embodiments of the invention.

DETAILED DESCRIPTION

While the specific examples presented below are in the context of the ISM band and the WLAN RAT, these are not limiting to the broader teachings of the invention which may be applied with similar advantages to TV WS or other license exempt radio spectrum, and/or using other RATs apart from WLAN and the IEEE 802.11 family of standards. In RATs developed for accessing license exempt bands there is typically a contention window or contention period during which different users may compete for the right to use the unlicensed channel so as to avoid their transmissions interfering with one another. Other non-WLAN systems may use a different name for this contention window, and/or for other procedures and channels that are functionally similar to those detailed below for WLAN systems without departing from these teachings.

Coordinating with WLAN or other license-exempt RAT systems to avoid severe interference or contention, while at the same time realizing co-existence with other systems and efficiently using the license exempt radio spectrum is an important challenge to meet current data throughput needs. As a supplement to cellular RATs the license exempt band provides multiple benefits. Assuming for example a 4G system (also known as E-UTRAN or long term evolution LTE of the UTRAN system) using the license exempt bands can enable new markets to LTE-based radio systems, additional capacity, and also new applications and communication solutions using LTE modem technology such as for example wireless machine-to-machine (M2M) and device-to-device (D2D) communications.

Figure 1B:
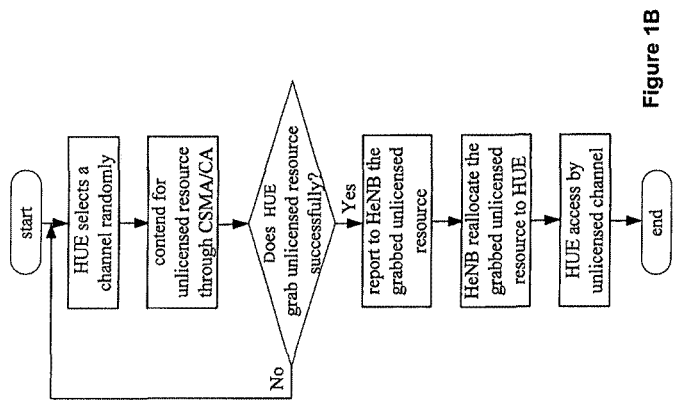
FIG. 1B is a flow diagram representing one potential approach for offloading traffic to license-exempt radio spectrum upon which certain embodiments presented herein improve.
Figure 1A:
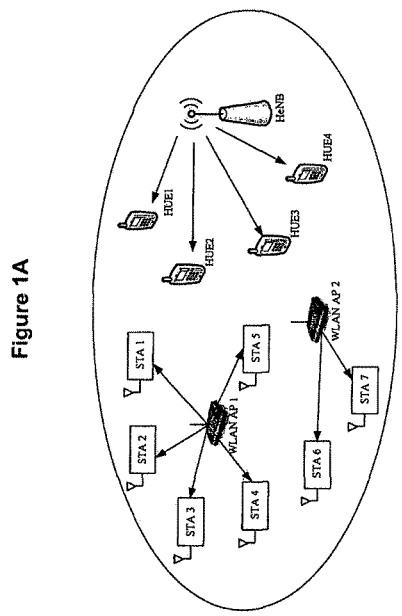
FIG. 1A is a schematic diagram illustrating an exemplary but non-limiting radio environment in which these teachings may be practiced to advantage.

FIG. 1A illustrates one exemplary but non-limiting radio environment to orient the reader. In the illustrated geographic area there are a plurality of WLAN access points (APs) each serving a respective group of stations (STAs) in the license-exempt band. In that same area there is a home eNB (HeNB, sometimes termed a pico or femto cell) serving its respective UEs (illustrated as home UEs or HUEs). The HUEs are controlled centrally by the HeNB through some licensed channel. To utilize the license exempt band in the LTE cell, the HUEs firstly participate the resource contention the same as the WLAN STAs through a carrier sensing multiple access with collision avoidance (CSMA/CA) mechanism which is detailed below with respect to FIG. 1C. Once a HUE grabs some license exempt radio resource, it will report the resource to HeNB through the licensed channel. After that, the HeNB will allocate the grabbed license exempt radio resource to multiple HUEs and schedule their transmissions. But there are multiple license exempt channels, and since the HUEs will compete for one or more of them with other HUEs and with the WLAN STAs there may be some wasted effort and time before any individual HUE secures any of them.

FIG. 1B is a flow diagram illustrating one straightforward way in which an HUE might select a channel from the multiple WLAN channels that are in use in the area. First, every HUE selects a channel randomly from the multiple optional channels. Next every HUE contends for their respective randomly selected channel, together with WLAN STAB, with each entity using the CSMA/CA mechanism. If the HUE does not grab the unlicensed resource successfully, then it might re-select an unlicensed channel for contention again. If instead the HUE grabs the unlicensed resource successfully, the HUE might then report to the HeNB the grabbed license exempt resource which the HeNB can re-allocate to the HUE (or to multiple ones of the HUEs) for its/their transmissions. A problem with the approach of FIG. 1B is that when HUEs contend for a license exempt resource/channel which is heavily loaded as FIG. 1 implies, there is an increased likelihood of collision/interference which of course reduces the likelihood of the HUE grabbing the license exempt resource in the first instance. For this reason random channel selection is not seen to be an optimized solution where there are multiple license exempt channels.

Figure 1C:
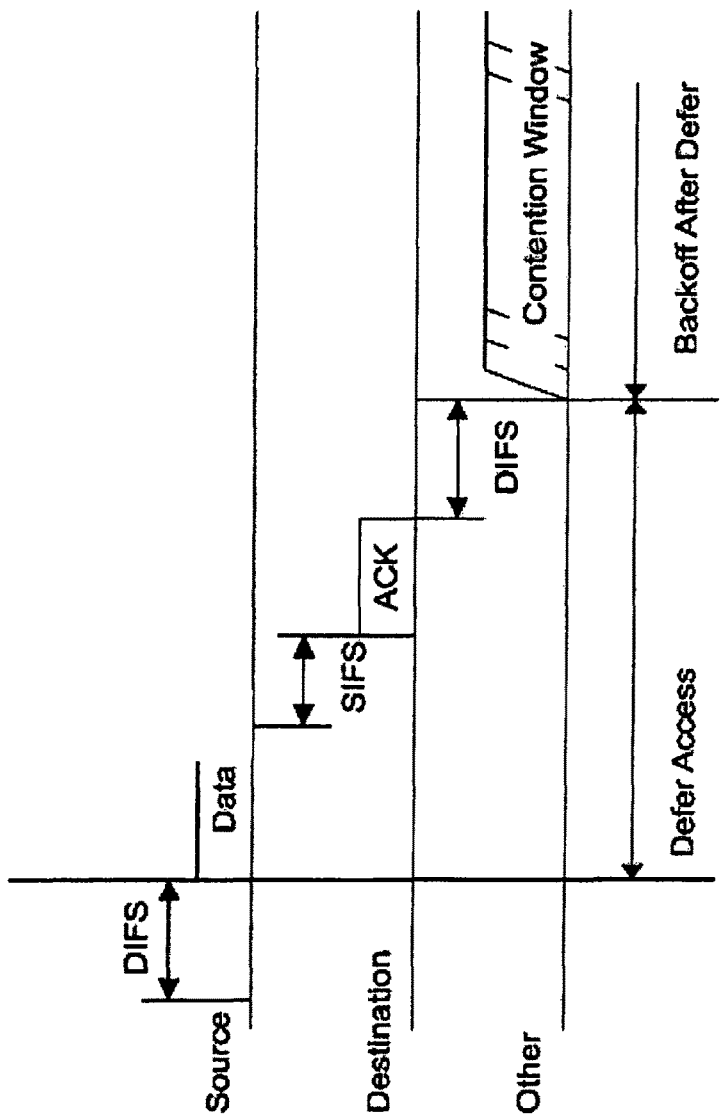
FIG. 1C is a prior art timing diagram showing time intervals and messages for a conventional WLAN source to access a WLAN channel and is background for how this conventional procedure may be adapted according to these teachings for another (LTE) device to access the WLAN channel.

FIG. 1C is a timing diagram for the contention period in the WLAN system, specifically the CSMA/CA mechanism for accessing the channel. The source of new data to send (such as the WLAN STA or the HUE in FIG. 1A) listens to the channel for a distributed coordination function interframe space (DCF interframe space or DIFS). Assuming it hears no other station transmitting on the channel during the DIFS the source entity sends its data. Upon reception of that data the destination entity awaits a short interframe space (SIFS) and assuming it receives and decodes the data correctly the destination entity then sends its acknowledgement (ACK).

At the same time some other station (another STA or HUE in FIG. 1A) is awaiting to send its own data transmission, but sine it hears the source's data and the destination's ACK the other station will defer its access until it also hears no other traffic for a DIFS (shown in FIG. 1C as following the ACK). Following that DIFS there are two possibilities. If there are no other stations waiting to transmit the channel enters a free state. If there is a further station (or the original source) waiting to send data the other station will enter its own contention window and send its data similar to what was shown already for the original source entity, with one exception. In order to prevent multiple stations from simultaneously initiating their respective transmissions at the same moment following an uninterrupted DIFS, each station will impose on itself a random backoff period in addition to the DIFS. The contention window backoff period is due to the CSMA/CA.

Now consider some specific (roughly calculated) times for the FIG. 1C timing diagram. Typically the data frame and the ACK frame transmission time and the SIFS time together is less than 408 is for 54 Mbps (per IEEE 802.11a/g) and 2117 is for 11 Mbps (per IEEE 802.11b) when considering the maximum length medium access control (MAC) frame. If after the ACK frame the channel is free, another device such as a UE offloading tis traffic from a cellular band could access the channel without any interference. If after the ACK the channel comes into the contention window period, the contention window (average 1 ms or nearly so) is typically too long as compared to the data transmission time.

This shows that the transmission efficiency in IEEE 802.11 is low because there are too many gaps introduced such as during the contention window using the ISM band. Embodiments of these teachings efficiently use these transmission gaps of the WLAN system without significant interference with the WLAN system to serve the LTE devices, thus improving spectrum usage rate and the throughput of the license exempt band.

The teachings below may be considered as divided into two broad categories. The first category is described with respect to FIGS. 2 through 5C and is particularly useful for using those WLAN gaps for sending data. The second category is described with respect to FIGS. 6 through 8 and is particularly useful for distributing different UEs/HUEs to access the different license-exempt channels in a manner more effective than random channel selection. Since the gaps are relatively small these different teachings are most advantageous depending on the volume of data there is to offload to the license exempt band. For example, M2M communications and intermittent updates to smartphone applications are often smaller volumes of data and so the first category is more likely to be a better solution for those implementations, whereas the second category is more likely to be a better choice in high volume data scenarios such as one device streaming video to another using D2D links. Finding those WLAN gaps in time to exploit the first category of these teachings depends on the traffic conditions, and distributing the UEs so their license exempt channel selection itself gives them a better likelihood of success in winning a contention for that channel also depends on the traffic conditions. The fact that these two broad categories of these teachings are separable does not make them mutually exclusive; the same entities may seek to exploit the WLAN gaps for data while at the same time optimizing WLAN channel selection to best assure a UE is able to grab the channel according to the CSMA/CA mechanism.

In an embodiment within the first category of these teachings there is a database with license exempt band coexistence information which obtains the usage information for the license exempt band from at least the WLAN APs that are operated by the cellular systems. Additionally, standardized reporting rules/formats can be arranged so that all the WLAN APs, not only those operated by the cellular systems, send their license exempt band usage information to the database periodically to help improve the coexistence of the future heterogeneous wireless networks which operate using the license exempt band.

In an embodiment within the first category of these teachings of these teachings, the cellular (LTE) devices dynamically access the license exempt band with the help of the license exempt radio spectrum usage information fusion information, and its corresponding statistic model self-configuration. Following are summarized three distinct elements of the first category of these teachings which enable this dynamic accessing of the license exempt band.

Firstly, there is the centralized database at which is gathered the license exempt band usage information from the access points. Some non-limiting examples of what this information might include is the WLAN AP channel number, the usage probability for that channel, the necessary physical layer (PHY) information to help quickly demodulate the PHY preamble and header of the WLAN frames, and so forth. Such a database might be known by several names, such as for example an "ISM band coexistence database (ISM DB)". This ISM database is used for transmitting the usage information of each channel to the cellular access nodes which in the LTE system are known as the eNB and/or the home eNB/HeNB). These transmissions from the centralized database to the eNBs/HeNBs is by example through the cellular core network (which is typically wired).

The database gathers the WLAN channel's usage information of different geo-location (for example, each WLAN channel's current state). This information is gathered from the WLAN APs which know this information exactly. The ISM database uses this information over an extended period of time to observe and develop a statistical traffic model of each WLAN channel. This information (for example, the spectrum usage statistic information) is made available to the eNB/HeNB via an "ISM information response" message according to the eNB's/HeNB's geo-location, which the database sends in response to receiving from the eNB/HeNB an "ISM information request" message.

Secondly, the eNB/HeNB sends "ISM access control" information through the licensed (cellular) band to control different D2D pairs, D2D clusters or cellular communication devices' ISM spectrum access parameters. Such information includes for example access probability and occupancy time.

Access probability refers to the probability of the LTE device's access of the ISM channel. Occupancy time refers to the current LTE frame's dwell time on the ISM channel. Both these parameters are generally related to the channel statistic information; both have an inverse relation with how busy is the channel. The value of these parameters is to be decided by the eNB/HeNB and conveyed to the relevant UEs.

Thirdly, the relevant LTE devices immediately access the WLAN channel with varying access probability and varying occupancy time after the current sensed WLAN frame and its corresponding ACK frame.

As will be detailed further in the examples below, the feature-based detection within the first category of these teachings can be used to read the IEEE 802.11 physical frame preamble and header to obtain accurate information of the current frame transmission time. Considering that after the current WLAN data frame and its corresponding ACK frame the WLAN channel will become free (in the case that no other station has data to transmit) or a new contention window period will begin, the LTE devices may then immediately access the license exempt channel with the respective access probability and occupancy time in order to efficiently use the transmission gaps of the normal WLAN traffic.

The access probability and occupancy time may in one embodiment according to the first category of these teachings be determined by a dynamic statistic model of each WLAN channel's traffic in order to maintain an efficient and fair coexistence method on the license exempt band between the WLAN and LTE systems.

In one specific embodiment according to the first category of these teachings there is also the option of the participating UEs (or cellular devices) to sense and report an "ISM measurement report" to their respective eNB/HeNB via the licensed cellular band, in order to add some necessary but supplemental information to the ISM information that is already cached at the eNB/HeNB which was received originally from the centralized database.

The original "ISM information" that was sent by the centralized database to the eNB/HeNB may not always be suitable enough on its own for a particular eNB/HeNB and its corresponding UEs. For this reason according to the first category of these teachings the UEs could perform enhanced operations of sensing and reporting this "ISM measurement report" to their respective eNB/HeNB to aid in verifying the appropriateness of the "ISM information" received from the centralized database.

Following is a non-limiting example within the first category of these teachings with further details to more clearly illustrate the above more generally stated points. This example assumes there is a cellular LTE system using the ISM band, and the main competitor to the LTE system's use of that license exempt ISM band is a WLAN device which uses CSMA/CA. If there are any D2D pairs and/or D2D clusters they are already established prior to the start of the example below. The eNB/HeNB is assumed to use a multi-dimensional time and frequency pre-schedule method to control different D2D pairs/clusters and cellular communication devices to utilize the ISM spectrum.

Figure 2:
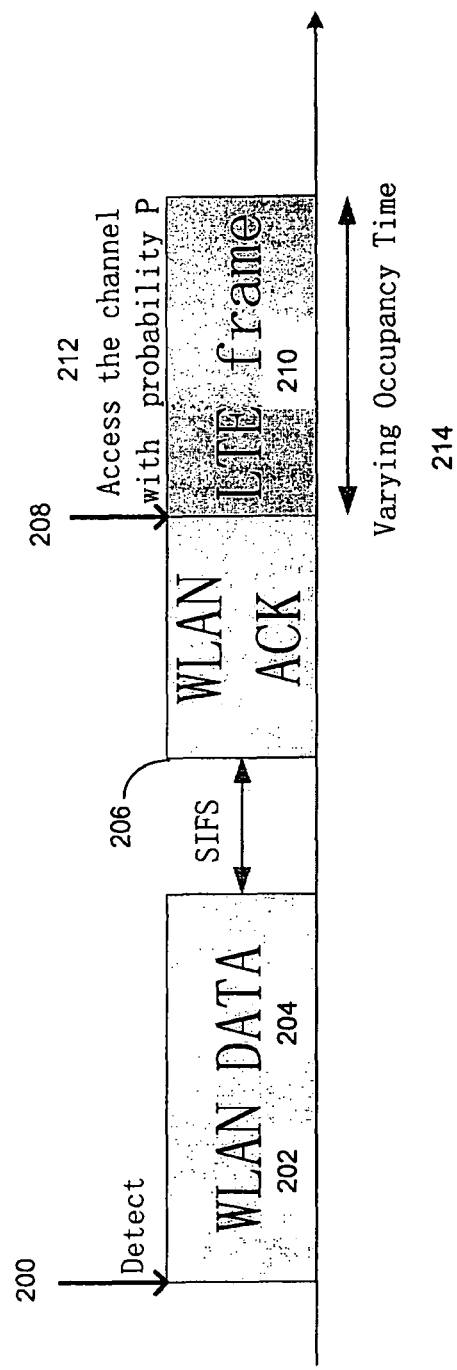
FIG. 2 is a timing diagram illustrating a conventional WLAN data frame, SIFS and ACK frame, immediately followed by access of the WLAN channel by an LTE device according to an exemplary embodiment of these teachings.

As shown at FIG. 2, the LTE device immediately accesses at time 208 the WLAN channel with varying access probability 212 and varying occupancy time 214 after the current WLAN data frame 202 (that is sensed/detected first at time 200) and its corresponding ACK frame 206 (with the requisite SIPS 204 between them). Recall from FIG. 1C that in conventional WLAN there can be no other transmissions after the ACK 206 until a DIFS has passed with no other transmissions, plus a random backoff period (assuming a contention window). The varying occupancy time 214 is designed so that the LTE frame 210 immediately following the WLAN ACK frame 206 will terminate prior to expiration of the standard WLAN DIFS period which also starts immediately following the WLAN ACK frame 206. The DIFS and SIFS are conventional for WLAN, with the DIFS being longer than the SIFS by design.

In the layout of the IEEE 802.11 PHY frame structure, there is a field containing the actual length or duration of the frame 202. Conventionally this field is in the PHY header. For example, in IEEE 802.11b, the LENGTH field (16 bits) in the PHY header contains the number of microseconds required to transmit the MAC protocol data unit (MPDU). In IEEE 802.11a/g/n, the LENGTH field (12 bits) indicates the octets of the transmitted MPDU, and additionally rate information is contained in a different RATE field (4 bits), and from these the transmission time of the MPDU can be easily calculated. Based on the MPDU time, we can deduce the whole PHY frame's transmission time can be easily deduced from the MPDU time. The MPDU is a MAC frame including the MAC header (see generally IEEE 802.11). The WLAN data frame 202 of FIG. 2 represents the MAC frame added to the PHY layer header and preamble.

The WLAN ACK medium access control frame 206 has 14 octets and so the respective transmission time for this frame 206 can also be easily deduced. The SIFS 204 time of WLAN systems is constant, related to the different PHY. From all of the above, a feature-based detection can be used to learn the related information contained in the IEEE 802.11 PHY header to precisely deduce the transmission time of the current WLAN frame 202 and its corresponding ACK frame 206.

Figure 3:
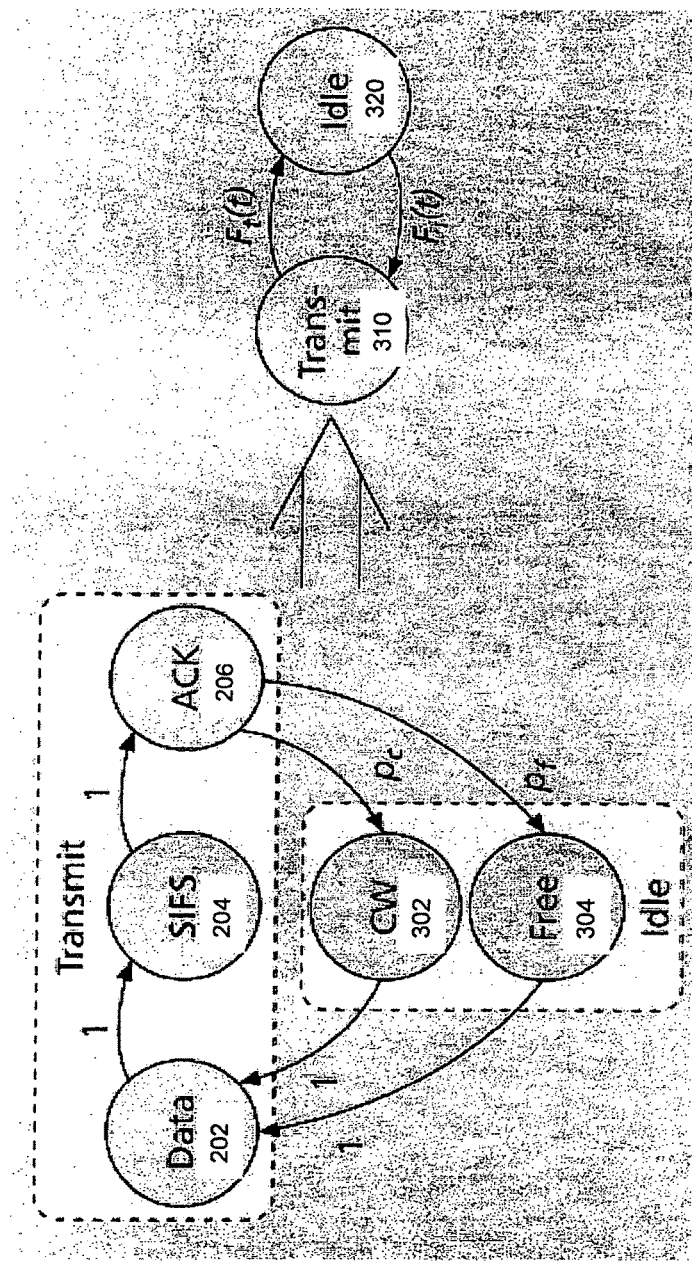
FIG. 3 is a prior art stochastic diagram of the WLAN frame transmission state.

Typically after the ACK frame 206 the WLAN channel may come into the state of free or contention window (with any backoff procedure in the contention window due to the CSMA/CA). FIG. 3 is a prior art stochastic diagram of the WLAN frame transmission state, taken from an article entitled DYNAMIC SPECTRUM ACCESS IN THE TIME DOMAIN: MODELING AND EXPLOITING WHITE SPACE (by Stefan Geirhofer, Lang Tong and Brian M. Sadler; IEEE Communications Magazine; May 2007). Reference numbers similar to those used in FIG. 2 refer to the similar frames/intervals. The data 202 state and the SIPS 204 state and the ACK 206 state along the top of FIG. 3 may be conveniently classified as the Transmit state 310, while the contention window (CW) 302 state and the Free 304 state are classified as the Idle state 320. For example, the contention window 302 is a uniformly distributed sojourn time while the Free state 304 exhibits a heavy-tailed distribution, so the overall IDLE state (CW+Free) is a mixture distribution.

After the duration of the Transmit state 310 and without any further energy detection in the relevant WLAN channel, the LTE devices may immediately access the WLAN channel at time 208 of FIG. 2 with varying access probability 212 and varying occupancy time 214 after successful transmission of the current WLAN frame 202 and its corresponding ACK frame 206. The access probability 212 and occupancy time 214 can be determined dynamically by the traffic information of each WLAN channel which is accumulated at and distributed from the centralized database. In this manner the LTE device accessing the ISM band via non-limiting examples of these teachings can efficiently use the transmission gaps of the WLAN system without causing too much interference to the WLAN system itself, which can potentially significantly improve the spectrum efficiency and throughput on the ISM band.

Figure 4A:
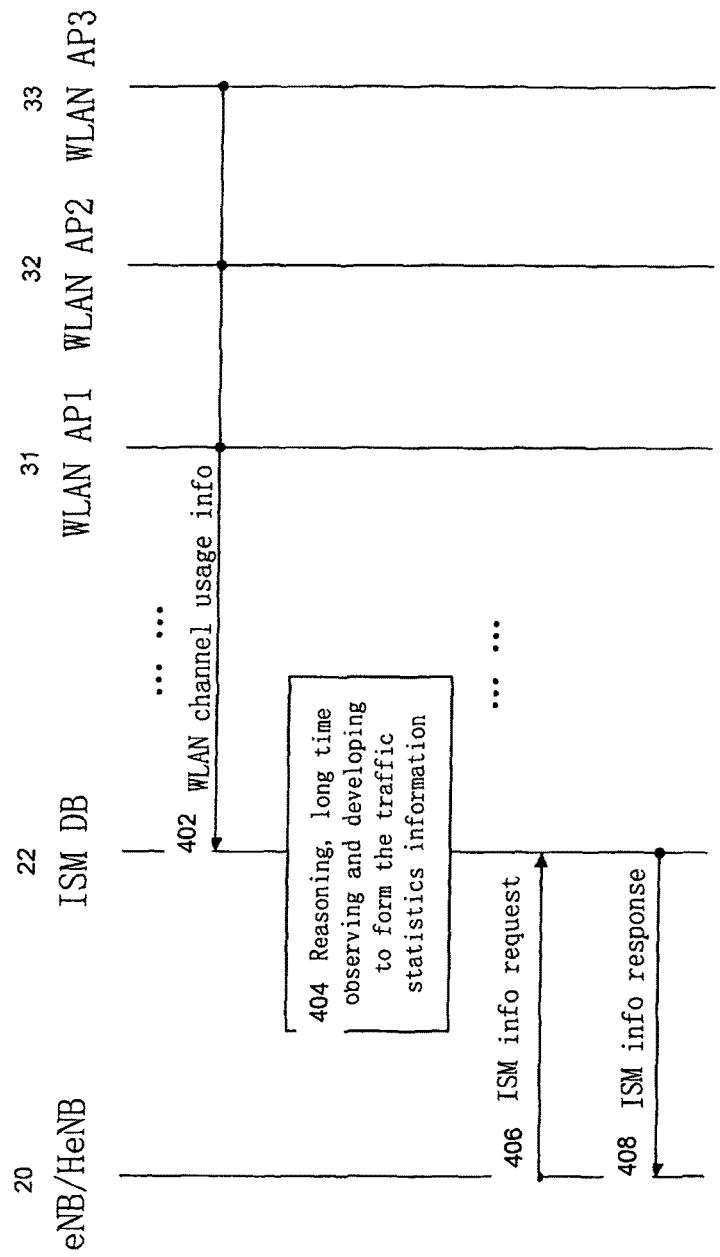
FIG. 4A is a signaling diagram illustrating how the relevant WLAN channel information is gathered at an ISM database 22 and distributed from that database to an eNB/HeNB 20 according to an exemplary embodiment of these teachings.

FIG. 4A is a non-limiting signaling diagram illustrating how the relevant WLAN channel information is gathered at an ISM database 22 and distributed therefrom to an eNB/HeNB 20 according to these teachings. An individual ISM database 22 may be responsible for gathering the WLAN channel usage information of WLAN APs 31, 32, 33 in a certain area, and provide replies to the eNBs/HeNBs 20 that are in a certain area and which requires the ISM information. While FIG. 4A denotes the database as only that, in an exemplary embodiment it is in fact a database system having processing capability as well as logic and communications capabilities for responding to requests received from other entities such as the eNB/HeNB 20. Such an exemplary database system is detailed further below with respect to FIG. 10.

In the FIG. 4A example all of the illustrated signaling is communicated via wired (including optical) links of the cellular core network since FIG. 4 assumes all the WLAN APs 31-33 are controlled by the cellular system itself. In other embodiments other WLAN APs which are independent of the cellular system may also provide their channel usage information to the database 22, such as over an Internet Protocol link which may or may not be wired.

Periodically, each of the WLAN APs 31-33 send usage information 402 for the various WLAN channels with which they operate to the ISM database 22. Some APs 31-33 may operate on only one channel while others operate on more than one WLAN channel, but regardless this usage information 402 is channel specific. In an exemplary but non-limiting embodiment this message 402 carries the fields shown at FIG. 4B. The BSSID field 410 gives the identifier for the relevant AP 31-33 which is sending the message 402; and the operating region field 411 identifies to the database 22 a geographic area in which the reporting AP 31-33 operates. This operating region field 411 need not be reported in each periodic report 402 from each AP 31-33 since the database 22 can associate a given BSSID with a given region after the first reporting of location by a given AP 31-33.

The remaining four fields 412-415 of FIG. 4B are channel-specific and so may be repeated for the case that a single message 402 includes information on multiple channels, or these four fields may not be repeated per channel for the case that information on the different WLAN channels is sent to the database 22 by the APs 31-33 in different messages 402. Whether one or more channels, there is a channel identification field 412 which identifies the relevant channel for which information is being reported. This may be identified by channel index/number, or center frequency, or some other agreed identifier. For each WLAN channel there is a traffic arrival rate field 413 which informs about the traffic seen by the reporting AP31-33 on the identified channel 412. As a non-limiting example this field 413 gives a traffic rate as the number of packets arriving per second over some pre-arranged averaging period. Another field 414 informs of distribution of idle period lengths and is historical information of the idle period 320 which as shown at FIG. 3 includes the state of free 304 and the contention window state 302 for the relevant WLAN channel. And finally in the WLAN channel usage information message 402 there is also in an embodiment an optional decoding field 415 that has physical layer information for quickly decoding the preambles and headers of the WLAN frames 202, 206 shown at FIG. 2. The LTE devices can use the information in this field 415 for aiding in learning soon after detecting (200 at FIG. 2) exactly when the ACK frame 206 will end and the time (208 at FIG. 2) at which they can transmit their data on the WLAN channel.

Returning now to FIG. 4A, the database 22 collects this WLAN channel usage information 402, and with its cached history of previous reports 402 on those channels extending back across some limited histogram window (to exclude data that is no longer relevant) can fuse all the channel-specific information together to develop a more specific set of information, including traffic statistics for each WLAN channel in a certain area. The ISM database 22 maintains this database of WLAN channel statistical information and updates it periodically. Additionally, the ISM database 22 maintains a table which associates the identifiers of the various eNBs/HeNBs it serves to their respective geographic location.

One an eNB or HeNB 20 has some ISM related requirement, it will send an ISM information request 406 to the database. This request 406 will include the eNB's/HeNB's cell identifier so the database can see where is the relevant geographic location of the requesting eNB/HeNB, and retrieve the WLAN channel statistics for that same geographic location (field 411 of FIG. 4B).

Figure 4C:
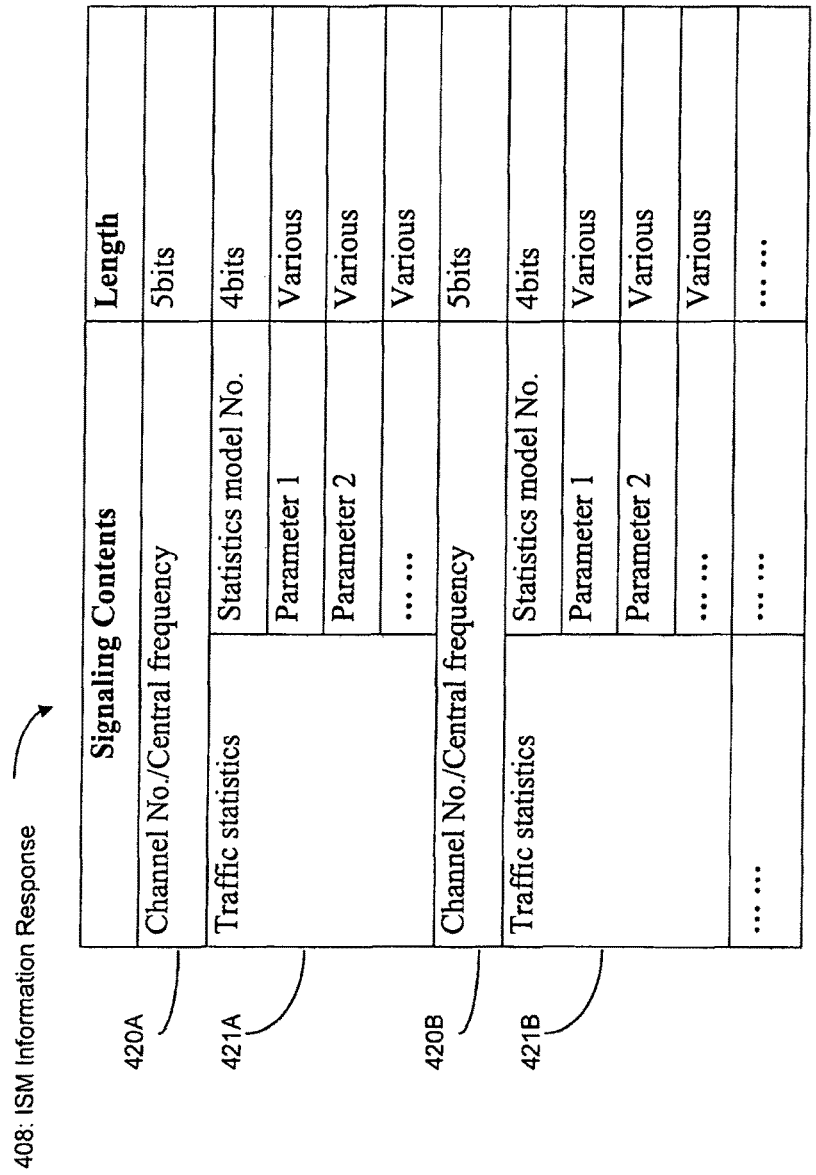

The database 22 responds with an ISM information response message 408 which has that retrieved statistical information for one or more WLAN channels. FIG. 4C has a non-limiting example of the contents of such a response message 408. In the FIG. 4C example that response 408 includes a series of competitive WLAN basic service set (BSS) channel identifiers at field 420A (channel numbers or central frequencies for example) and the traffic statistics at field 420B corresponding to that channel.

FIG. 4C assumes there are a set of statistics models pre-arranged between the database 22 and the eNB/HeNB 20 so the response message 408 need only identify a particular statistics model number and a few parameters to plug into the equations associated with that model to get the traffic statistics for the identified WLAN channel. For example, using 4 bits to denote the statistics model number as in FIG. 4C implies a maximum of 16 different models, but this is only an illustration of the more general principles. There are many other ways for the response message 408 to carry the relevant information to the eNB/HeNB 20, the statistics traffic model approach is simply one way to reduce control signaling overhead as compared to reporting raw data via the core network to the eNBs/HeNBs.

Figure 5A:
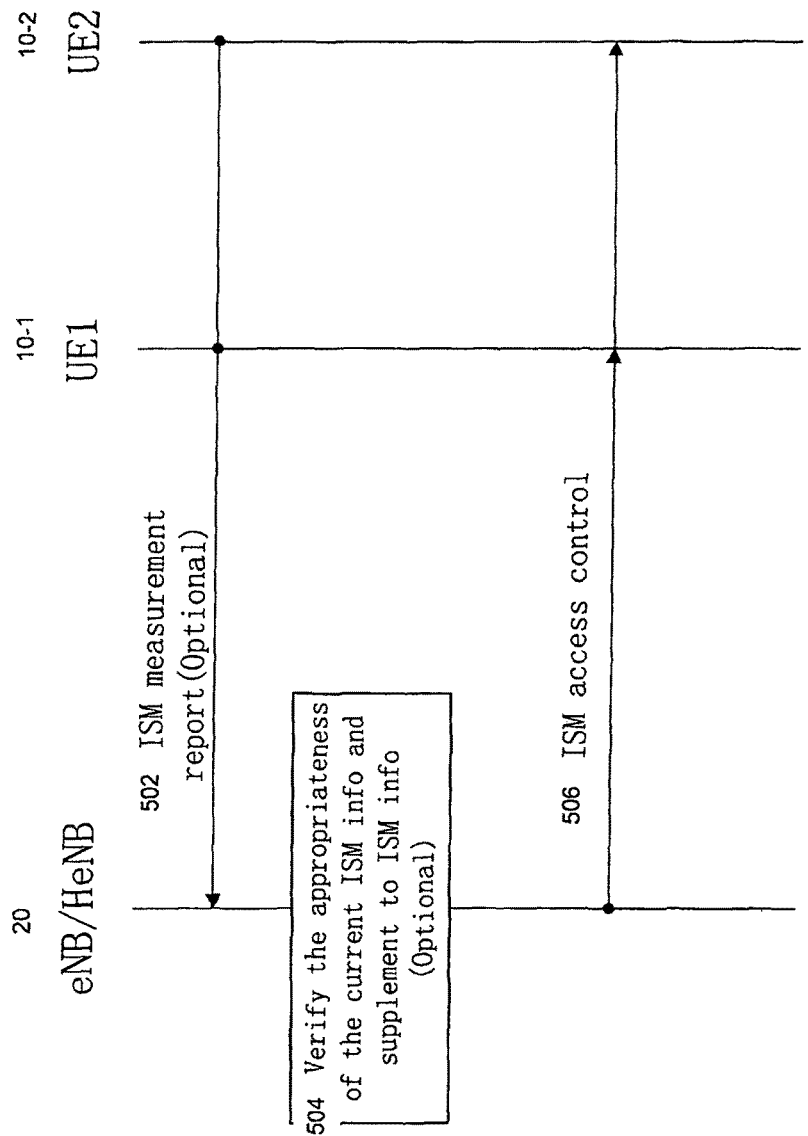
FIG. 5A is a signaling diagram illustrating how the relevant WLAN channel information and access parameters are distributed to the UEs from the eNB/HeNB 20 according to an exemplary embodiment of these teachings.

FIG. 5A is a non-limiting signaling diagram illustrating how the relevant WLAN channel information is distributed from the eNB/HeNB 20 to the UEs 10-1, 10-2 which are seeking to access the WLAN channel(s) according to these teachings. The relevant UE 10-1, 10-2 will sense the ISM channel and send to the eNB/HeNB 20 an ISM measurement report 502. The eNB/HeNB 20 will verify 504 the appropriateness of the current cached ISM information which it received at FIG. 4A from the database 22, and in one particular but non-limiting embodiment will also supplement the current cached ISM information with the current ISM information provided in the measurement report(s) 502. Once this update is complete the eNB/HeNB 20 sends the relevant information to the UE(s) 10-1, 10-2 in an ISM access control message 506. In the FIG. 5A example the UEs 10-1, 10-2 form a D2D pair engaging in direct device-to-device communications on the license exempt band. The ISM access control message 506 controls this D2D pair's access of the WLAN channel, their access probability and their occupancy time on that channel.

More specifically, if the UE 10-1, 10-2 has requirements such as D2D communications on the ISM band, it or they will sense the ISM channel and then send the ISM measurement report 502, which carries information shown by non-limiting example at FIG. 5B. For each channel sensed and reported the UE 10-1, 10-2 will include a channel identification field 510A and a measurement information field 511A for that channel; in the FIG. 5B example this latter field 511A carries the percentage level of how much that channel is used. If there are other WLAN channels which the UE(s) 10-1, 10-2 have sensed these also are reported in repeating fields shown at FIG. 5B as 510B and 511B.

FIG. 5C illustrates a non-limiting example of information fields carried in the ISM access control message 506. Preferably the eNB/HeNB 20 will select one of the WLAN channels which is identified in field 520, and report in that message 506 the access probability 521 and occupancy time 522 that the database originally determined (at 404 of FIG. 4A) and which in an embodiment the eNB/HeNB 20 may have updated at 504 of FIG. 5A with the supplemental measurement information 502. Another control field 523 may be present that carries additional control information such as frequency and time information for accessing the WLAN channel, and there may also be some decoding information included at field 524 for the UEs 10-1, 10-2 to more quickly decode other WLAN data frames and ACK frames (202 and 206 of FIG. 2) so as to know at what time instant (208 of FIG. 2) they can access the WLAN channel without interfering with conventional WLAN communications. By example such decoding information is shown at FIG. 5C as the WLAN channel number used by the relevant AP in the UE's geographic region, and the modulation and coding scheme (MCS) that AP and its associated stations are using for their conventional WLAN communications. In this manner the eNB/HeNB 20 can send pre-schedule information (field 523) for multiple UEs 10-1, 10-2 to share the channel or channels in the license exempt radio spectrum.

Different embodiments of the first main category of these teachings offer one or more of the following technical advantages: they efficiently use the transmission gaps of WLAN without significant interfere with the conventional WLAN communications in order to serve the LTE/cellular devices which are using ISM band (such as for D2D communications). This has the potential to significantly improve the spectrum usage rate and the throughput of the ISM band. The ISM database 22 can be a beneficial supplement to the current cellular network due to its potential usage to help the coexistence of a heterogeneous wireless network operating in the ISM band. That ISM database 22 can also aid future evolutions of IEEE 802.11 and assist with coexistence between different WLAN operators for interference coordination. And while there is additional signaling involved to implement the above specific examples, most of this may be done through the cellular core network. Only the messages 502 and 506 of FIG. 5A which go to and from the UEs need to occupy the more scarce wireless resources, but these are seen to be quite minimal as compared to the efficiencies gained from utilizing the transmission gaps that are within conventional WLAN. In the above examples these messages 502 and 506 are communicated between the eNB/HeNB 20 and the UEs 10-1, 10-2 using licensed/cellular resources.

Figure 6:
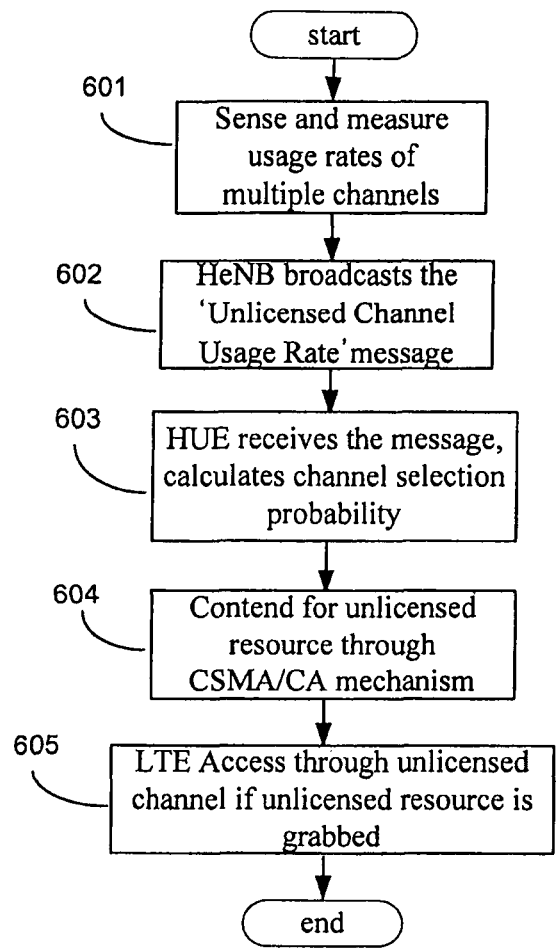

Now is described with respect to FIGS. 6-8 the second category of these teachings which influence the UE's selection of which license exempt channel for which they will contend. In this category there is a distributed channel selection mechanism for each cellular/LTE UE, which may be a HUE as shown at FIG. 1A. This mechanism is used by UE to select one channel from multiple unlicensed channels and contend for license exempt radio resources to maximize its probability of success in contending for the license exempt resource for the HeNB/femto-cell.

There are two important points to consider when reviewing the specific examples of FIGS. 6-8 presented below. First, the eNB (or HeNB) broadcasts a downlink message (which we term herein an Unlicensed Channel Usage Rate message) to the UEs. The message contains, for each of a plurality of license exempt channels, the channel number and the channel usage rate. Second, the UE distributively calculates the channel selection probability for every optional license exempt channel based on the received channel usage rates, and stochastically selects one channel based on the calculated probability distribution.

FIGS. 6-8 make the following four assumptions.

The unlicensed channels are mutually orthogonal.

eNB/HeNB and UEs/HUEs can reside on one and more channels/frequency bands.

Every UE/HUE can report the grabbed license exempt resource via a (licensed) LTE link.

The eNB/HeNB can re-allocate the grabbed license exempt resource to one or more UEs/HUEs.

FIG. 6 is a logic flow diagram for a non-limiting embodiment of the second category of these teachings concerning optimizing channel selection for a UE to contend for the WLAN (ISM/license exempt) radio channel, in view of the above scenario and assumptions. FIGS. 7 and 8 provide further signaling details for two more specific embodiment of the more generic flow diagram of FIG. 6. While these diagrams illustrate a HeNB 20 and Hues 10-1, 10-2, these representations are non-limiting examples of the entities which might be practicing the elements of these teachings shown there. For example, the HeNB 20 may be more generically a base station or network access node, and the HUEs may be referred to more generically as UEs.

The HeNB 20 senses and measures the multiple unlicensed channels at block 601 of FIG. 6, and then it calculates the statistics of the channel usage rate for each of them. This same step is shown in FIGS. 7-8 as reference numbers 701 and 801 respectively. The channel usage rate of course represents traffic on the channel, so like the first category of these teachings which are detailed above with respect to FIGS. 2-5C this second category also uses channel-specific statistical traffic information.

At block 602 the HeNB 20 sends a downlink message to its HUES 10-1, 10-2 whose contents give the usage rates on the different license-exempt channels. In one embodiment this message is broadcast and is termed an 'Unlicensed Channel Usage Rate' message, shown in FIGS. 7-8 as downlink broadcast message 702 and 802. This message 602 contains information of all the measured license exempt channels, such as for example channel number and that channel's usage rate for each of the plurality of WLAN channels.

Once a HUE receives the message, blocks 603, 703 and 803 of respective FIGS. 6, 7 and 8 shows that the HUE distributively calculates the channel selection probability for every license exempt channel in message 602 that the HUE is capable of accessing. This channel selection probability is calculated based on the received channel usage rates, and the HUE at blocks 704 and 804 of FIGS. 7-8 stochastically selects one channel based on the calculated probability distribution.

For example, if we assume there are only two unlicensed channels Ch1 and Ch2 (orthogonal to one another), the HUE at block 704/804 can select Ch1 according to probability P1, and select Ch2 according to probability P2. Here P1 and P2 are the channel selection probabilities that the HUE calculated at blocks 703/803 based on the channel usage rates the HUE received from the HeNB 20 in message 702/802. As a more specific example, assume the channel usage rate is 0.1 for Ch1 and 0.6 for Ch2. This means the HUE will calculate P1=1−(0.1/(0.1+0.6))=6/7, and will also calculate P2=1/7. This HUE will then stochastically select channel Ch1 with probability of 6/7, and select channel Ch2 with probability of 1/7. Note that, even with the same channel selection probability P1 and P2, the stochastic selection result at different HUEs may not be the same.

After selecting a license exempt channel, each HUE then starts to contend for a license exempt resource on the selected channel as shown at block 604 of FIG. 6. In the WLAN system they would each follow the CSMA/CA mechanism, in other types of shared-band systems there might be a different procedure. FIGS. 7-8 also illustrate that the HUE sends a request to send (RTS) message 705a/805a and receives a clear to send (CTS) message 705b/805b in reply, both in the license exempt band and on the selected channel. The RTS-CTS exchange is a technique known in the license-exempt radio arts to mitigate the well known 'hidden node' problem, where another UE/STA within the range of the HeNB 20 of FIG. 7 (or the WLAN AP for FIG. 8) but outside the range of the HUE 10-1 might potentially send its own transmission which can interfere with that of the HUE 10-1 at the eNB 20 (or WLAN AP as the case may be).

Now assuming some HUE 10-1 grabs some resources on the license exempt channel it selected unlicensed channel (that is, the HUE reserves some radio resource on the unlicensed channel through the CSMA/CA contention mode), that part of the license exempt resource can be used by the HeNB for offloading cellular traffic (including re-allocating the resource to the original HUE or to a D2D pair or cluster of which it is a member).

In FIG. 7 the HeNB 20 is operating in both the licensed (LTE) and the license exempt (WLAN) bands. It therefore acts as the WLAN AP in the WLAN radio access technology, and so the RTS/CTS exchange is between the HUE 10-1 and the HeNB 20 operating as WLAN AP. In FIG. 8 the HeNB 20 need only operate in the licensed band since in that figure a different HUE 10-2 acts as the WLAN AP for WLAN communications with the original HUE 10-1, meaning the RTS/CTS exchange is between HUES 10-1 and 10-2 and the HeNB 20 need not be a part of that exchange. In both cases the HeNB 20 re-allocates the grabbed license exempt radio resource via the licensed band. And also in both cases the HUE (at least HUE 10-1 in both FIGS. 7-8) operates in both the licensed and license exempt bands.

In this second category of these teachings the LTE HUE 10-1 and WLAN STAs contend for a resource in the license exempt channels simultaneously and in the same method (CSMA/CA in WLAN), so the approach is fair for both those entities. Since the HUE 10-1 selects a channel according to the channel usage rates, traffic load on the license exempt channels can be more efficiently balanced than the conventional random channel selection approach.

Different embodiments of the second main category of these teachings offer one or more of the following technical advantages. As noted above this offers fairness to the cellular/LTE HUEs/HeNBs and to the WLAN STAs/APs, since every LTE HUE or WLAN STA contends for the license exempt resources simultaneously in the same CSMA/CA method. Additionally this approach efficiently balances traffic load among multiple unlicensed channels because the HUEs select the license exempt channel based on the channel usage rate so the selection probability of a heavily loaded channel is proportionately smaller than that of a minimally loaded channel. Another advantage of this channel selection rule is that it increases the probability that the HUE will successfully contend for the channel it selects as compared to a random channel selection. This follows from the fact that the HUEs' access to channels with heavier loads (and thus a higher collision probability) is reduced. While there may be a temporary spike in collision rate when multiple HUEs simultaneously select the same minimally loaded channel, this is seen to be a transient condition that self corrects, and is well offset by the fairness with the WLAN devices and the efficient balance noted above.

Figure 9A:
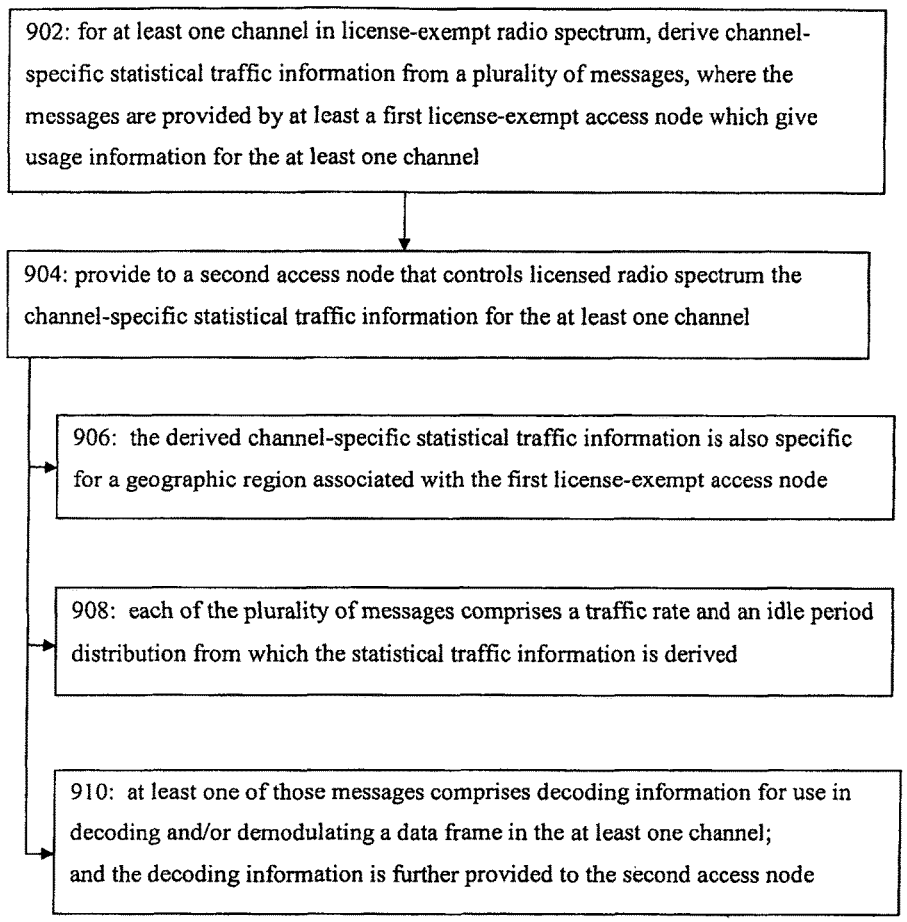
FIGS. 9A-C are each logic flow diagrams that illustrates from the perspective of different entities described herein the operation of a method, and a result of execution of computer program instructions embodied on a computer readable memory, in accordance with certain exemplary embodiments of these teachings.
Figure 9B:
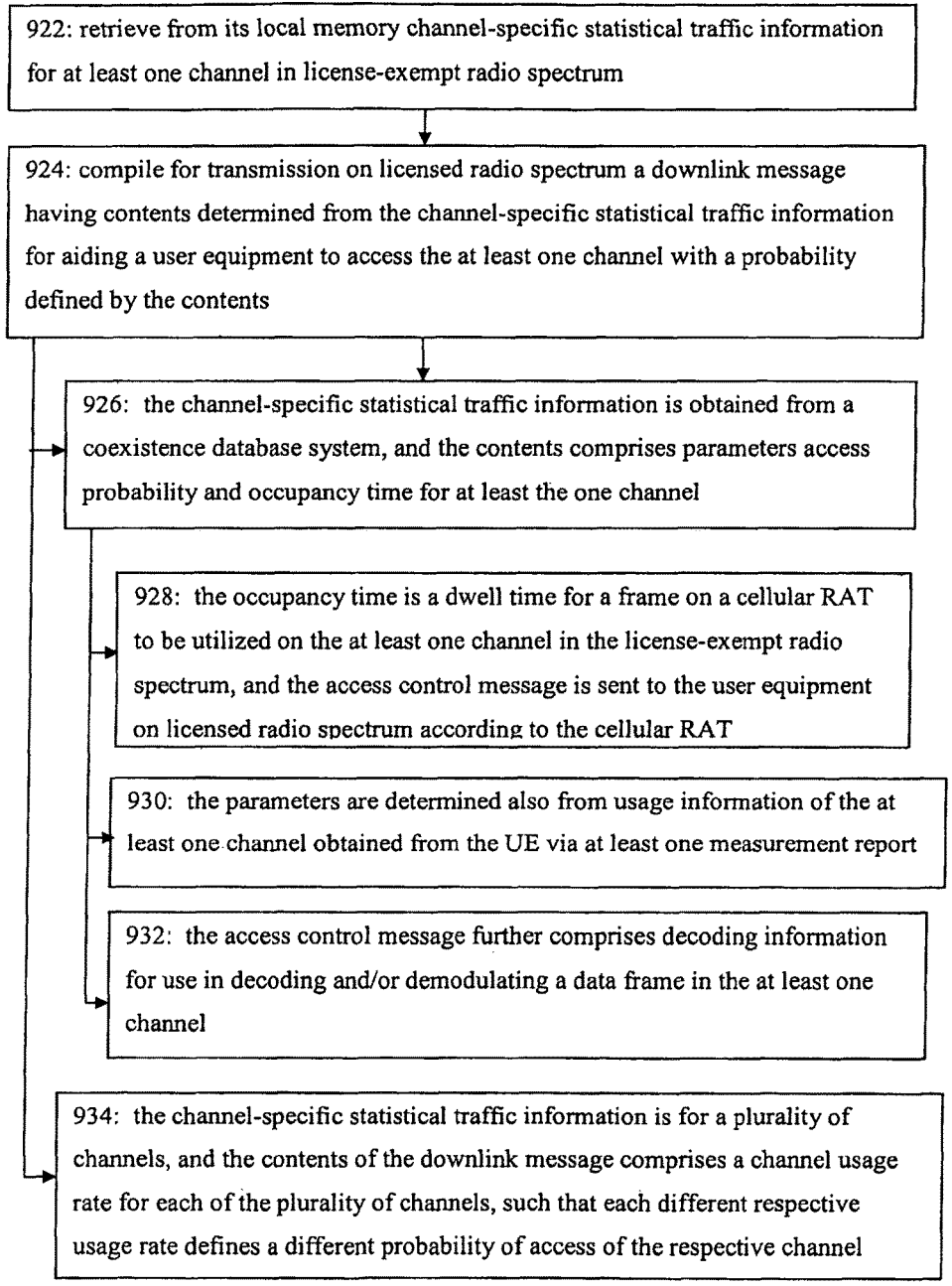
Figure 9C:
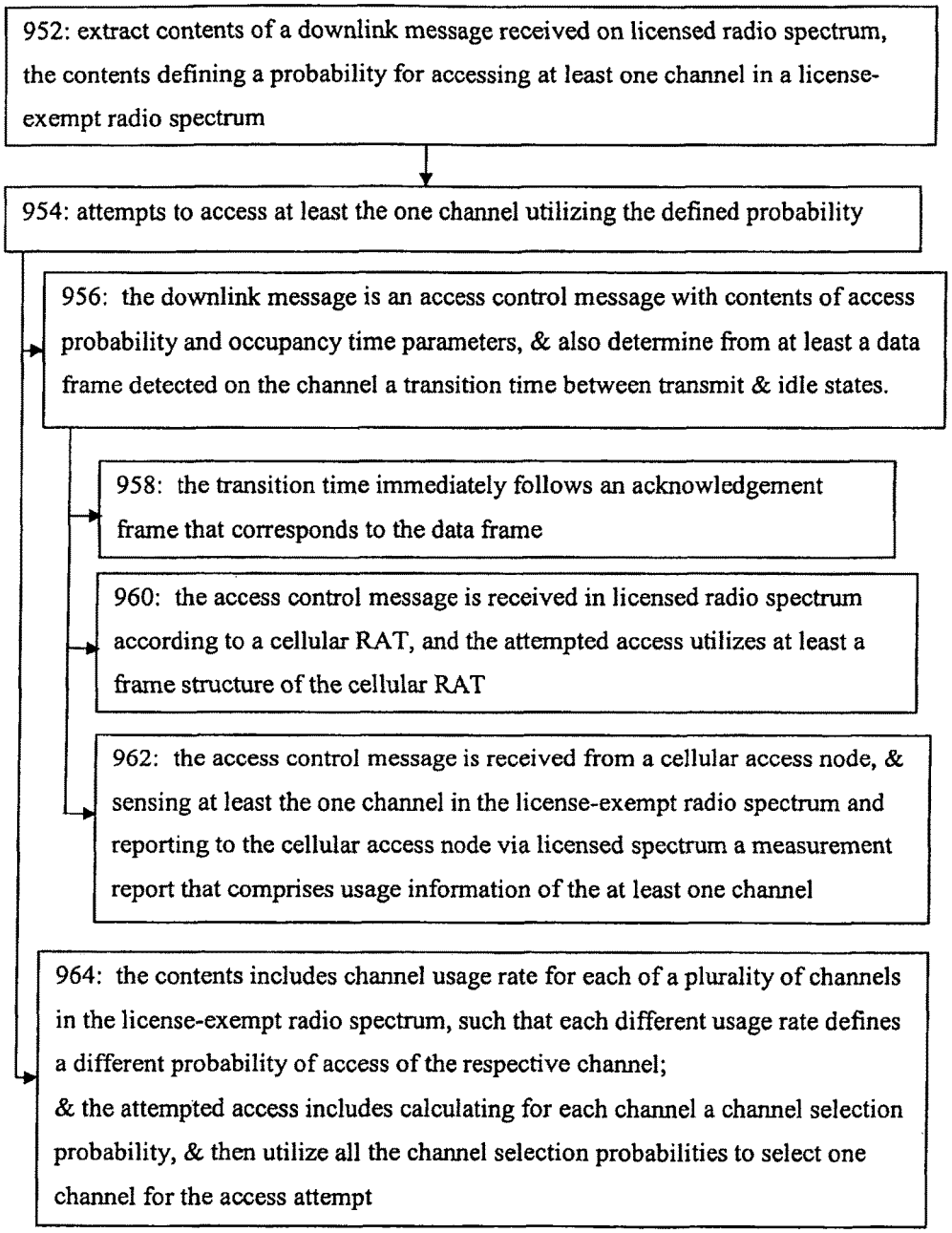

FIGS. 9A-C are each logic flow diagrams which summarizes some example embodiments of the invention. FIG. 9A illustrates the first category of these teachings from the perspective of the database system (FIG. 9A). While FIG. 9A illustrates a database system alone, such a database system may be embodied in a given eNB/HeNB or other radio access point/node in a non-limiting embodiment. FIGS. 9B-C illustrate both categories of these teachings from the perspective of the cellular access node (FIG. 9B) and of the user equipment (FIG. 9C). Any of the apparatus implementing any of FIGS. 9A-C may be implemented by the entire device/system 22, 20, 10, or by one or more components thereof such as a modem, chipset, or the like. Each of FIGS. 9A-C may be considered to illustrate the operation of a method for operating a device or database system, and a result of execution of a computer program tangibly stored in a computer readable memory, and a specific manner in which components of an electronic device or database system are configured to cause that electronic device/system to operate.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) or (ii) portions of processor(s)/software (including digital signal processor(s)), software, and memory(ies) that work together to cause an apparatus, such as a mobile phone/UE, to perform the various functions summarized at FIG. 3) and (c) circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" also covers, for example, a baseband integrated circuit or applications processor integrated circuit for a mobile phone/user equipment or a similar integrated circuit in a server, a cellular network device, or other network device.

First consider FIG. 9A which is from the perspective of the database system. At block 902, for at least one channel in license-exempt radio spectrum the database system is operated to derive channel-specific statistical traffic information (404 of FIG. 4A) from a plurality of messages (402 of FIG. 4A), where the messages are provided by at least a first license-exempt access node (any of the APs 31-33 in the above examples) which give usage information for the at least one channel. At block 904 the database system is controlled to provide (408 of FIG. 4A) to a second access node (the eNB/HeNB 20 in the above examples) that controls licensed radio spectrum the channel-specific statistical traffic information for the at least one channel.

The following reviews some of the non-limiting examples that are detailed with more particularity above. In one specific embodiment summarized at block 906 the derived channel-specific statistical traffic information is also specific for a geographic region associated with the first license-exempt access node/AP. Block 908 summarizes that each of the plurality of messages comprises a traffic rate (field 413 of FIG. 4B) and an idle period distribution (field 414 of FIG. 4B) from which the statistical traffic information is derived. And block 910 summarizes that in one particular non-limiting embodiment at least one of those messages noted at block 902 comprises decoding information (field 415 of FIG. 4B) for use in decoding and/or demodulating a data frame (202 of FIG. 2) in the at least one channel; and the decoding information is further provided to the second access node. This is so the eNB/HeNB 20 can provide this also to its UEs in field 524 of FIG. 5C.

FIG. 9B is from the perspective of the cellular access node eNB/HeNB 20. At block 922 it retrieves from its local memory (20B at FIG. 10) channel-specific statistical traffic information for at least one channel in license-exempt radio spectrum. Then at block 924 the eNB/HeNB 20 compiles for transmission on licensed radio spectrum a downlink message having contents determined from the channel-specific statistical traffic information. This message and contents are for aiding a user equipment (10) to access the at least one channel with a probability defined by the contents.

As a brief review of some of the non-limiting examples that are detailed with more particularity above for the first category of these teachings, at block 926 the channel-specific statistical traffic information (408) is obtained from a coexistence database system (22), and the contents of the downlink message comprises parameters for accessing the at least the one channel, where the parameters comprise at least access probability (field 521 of FIG. 5C) and occupancy time (field 522 of FIG. 5C) for at least the one channel. In this example the downlink message was an access control message (506 of FIGS. 5A and 5C). Block 928 specifies that the occupancy time is a dwell time for a frame (210 of FIG. 2) on a cellular radio access technology to be utilized on the at least one channel in the license-exempt radio spectrum, and the access control message is sent by the wireless network access node to the user equipment on the licensed radio spectrum according to the cellular radio access technology. Block 930 reviews that in one non-limiting embodiment the parameters are determined from the channel-specific statistical traffic information obtained from the coexistence database system, in conjunction with usage information of the at least one channel obtained from the user equipment via at least one measurement report (502 of FIG. 5A). And also block 932 describes that the access control message further comprises decoding information (field 524 of FIG. 5C) for use in decoding and/or demodulating a data frame in the at least one channel. In a non-limiting embodiment that access control message may further include pre-schedule information for multiple UEs to share the seized channel(s) in the license exempt radio spectrum, such as was detailed above with respect to FIG. 5C for distributing time and frequency resources to multiple UEs.

As a brief review of some of the non-limiting examples that are detailed with more particularity above for the second category of these teachings, at block 934 the channel-specific statistical traffic information is for a plurality of channels in license-exempt radio spectrum and is obtained from sensing and measuring the plurality of channels by the wireless access node (601 of FIG. 6) or in another embodiment from a plurality of uplink messages received from a plurality of user equipments (as may be reported at 701/801 of FIGS. 7-8); and the contents of the downlink message (602 of FIG. 6) comprises a channel usage rate for each of the plurality of channels, such that each different respective usage rate defines a different probability of access of the respective channel. As shown at block 602 of FIG. 6, in an embodiment that downlink message may be broadcast by the wireless network access node (20) on the licensed radio spectrum according to a cellular radio access technology. And as further shown at 806 of FIG. 8, for the embodiment in which the eNB 20 receives on the licensed radio spectrum from one of the plurality of UEs an uplink report indicating that the one UE has obtained one of the plurality of channels, the eNB 20 in response re-allocates the obtained channel for use by at least the one UE.

FIG. 9C is from the perspective of the UE 10. At block 952 it extracts contents of a downlink message received on licensed radio spectrum, the contents defining a probability for accessing at least one channel in a license-exempt radio spectrum. Then at block 954 the UE attempts to access at least the one channel utilizing the defined probability. The UE attempts access at block 954 because there is no guarantee it will make a successful access in the license exempt band.

Similar to FIGS. 9A-B, the remainder of FIG. 9C reviews of some of the non-limiting examples that are detailed above. Specifically for the first category of these teachings, block 956 details that the downlink message comprises an access control message (506 of FIG. 5A), the contents comprises parameters for accessing at least the one channel, the parameters comprising at least access probability (field 521 of FIG. 5C) and occupancy time (field 522 of FIG. 5C) for at least the one channel; and there are additional elements/steps of determining from at least a data frame (202 of FIG. 2) detected on at least the one channel a transition time (208 of FIG. 2) between a transmit state (310 of FIG. 3) and an idle state (320 of FIG. 3); and that the attempted access is at the transition time utilizing the access probability and for no longer than the occupancy time. Block 958 tells that the transition time immediately follows an acknowledgement frame (206 of FIG. 2) that corresponds to the data frame (202 of FIG. 2). Block 960 describes that the access control message is received in licensed radio spectrum according to a cellular radio access technology RAT, and the attempted access utilizes at least a frame structure (210 of FIG. 2) of the cellular RAT. And finally block 962 gives the embodiment in which the access control message is received from a cellular access node (eNB/HeNB 20 in the above examples), and the UE further senses at least the one channel in the license-exempt radio spectrum and reports to the cellular access node via licensed radio spectrum a measurement report (502 of FIG. 5A) that has usage information of the at least one channel.

As a brief review of some of the non-limiting examples that are detailed with more particularity above for the second category of these teachings, block 964 details that the contents of the downlink message (602 of FIG. 6) comprises a channel usage rate for each of a plurality of channels (Ch1 and Ch2 in the example) in the license-exempt radio spectrum, such that each different respective usage rate defines a different probability of access of the respective channel. In this case the attempted access of block 954 includes the UE 10-1 calculating for each of those channels a respective channel selection probability, and the UE utilizes all the channel selection probabilities to select one of the channels on which the access attempt is made. As shown at message 806 of FIG. 8 the UE in a non-limiting embodiment may also send to the network access node on the licensed radio spectrum an uplink report indicating that the UE has obtained the selected one of the channels on which the access attempt was made; and in response the UE receives from the network access node a re-allocation of the selected one of the channels. And also in the non-limiting embodiments shown at FIGS. 6 and 7-8 the downlink message was a broadcast message and the UE further, prior to receiving that downlink message, sensing at least two of the plurality of channels and sending to the network access node an uplink measurement report (701 and 801 in FIGS. 7-8) indicating results of the sensing. Or in another embodiment noted above the eNB/HeNB 20 can do the channel sensing and measuring itself.

Figure 10:
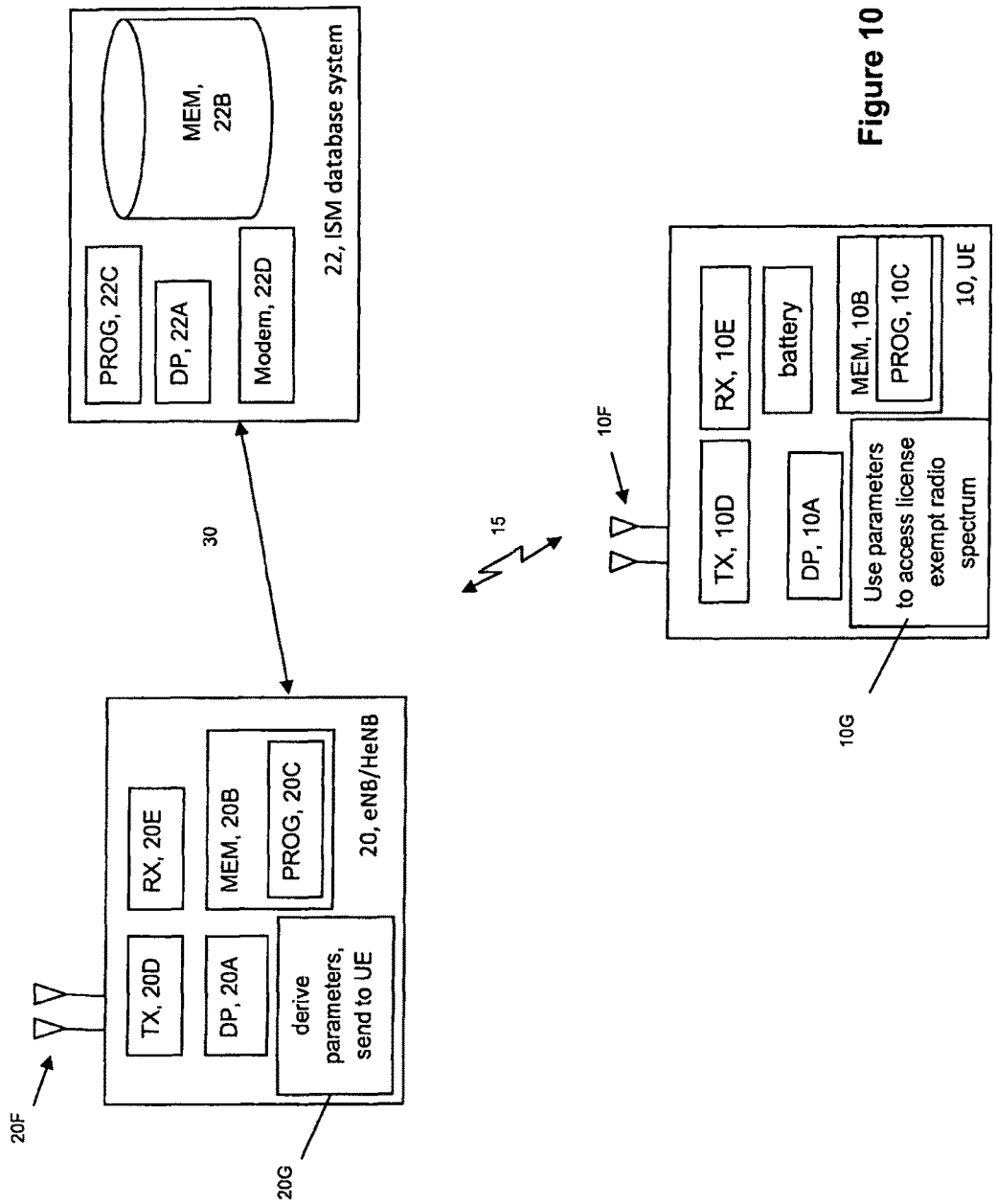
FIG. 10 is a non-limiting example of a simplified block diagram of a UE and its serving access node eNB/HeNB as well as the centralized ISM database system, and are exemplary electronic devices suitable for use in practicing some example embodiments of these teachings.

Reference is now made to FIG. 10 for illustrating a simplified block diagram of various electronic devices and apparatus that are suitable for use in practicing some example embodiments of this invention. In FIG. 10 the cellular wireless network is represented by the eNB/HeNB 20, or more generally an access node if these teachings are implemented in other than an E-UTRAN environment. The eNB/HeNB 20 is adapted for communication over a wireless link 15 with an apparatus such as one or more UEs 10 such as a portable radio device/terminal. The network may also provide connectivity with a broader network (e.g., another cellular network and/or a publicly switched telephone network PSTN and/or a data communications network/Internet). Connectivity to the APs as in the above examples is through a core network which is well known in the art and not particularly shown at FIG. 10.

The UE 10 includes processing means such as at least one data processor (DP) 10A, storing means such as at least one computer-readable memory (MEM) 10B storing at least one computer program (PROG) 10C, communicating means such as a transmitter TX 10D and a receiver RX 10E for bidirectional wireless communications with the network access node/eNB 20 via one or more antennas 10F. Also stored in the MEM 10B at reference number 10G is the UE's rules for using the access control parameters provided by the eNB/HeNB 20 for accessing the license-exempt radio spectrum, as is detailed further above.

The eNB/HeNB 20 also includes processing means such as at least one data processor (DP) 20A, storing means such as at least one computer-readable memory (MEM) 20B storing at least one computer program (PROG) 20C, and communicating means such as a transmitter TX 20D and a receiver RX 20E for bidirectional wireless communications with the UE 10 via one or more antennas 20F. The eNB/HeNB 20 may also have software at 20G for deriving the parameters which it inserts in the access control message that the eNB/HeNB 20 compiles for and sends to the UE 10.

For completeness there is also shown the ISM database system 22 which has its own processing means such as at least one data processor (DP) 22A for deriving the statistical traffic information, storing means such as at least one computer-readable memory (MEM) 22B storing at least one computer program (PROG) 22C, and communicating means such as a modem 22D for bidirectional communications with the eNB/HeNB 20 via a data/control path 30.

While not particularly illustrated for the UE 10 or for the eNB/HeNB 20, those devices are also assumed to include as part of their wireless communicating means a modem which may be inbuilt on an RF front end chip within those devices 10, 20 and which also carries the TX 10D/20D and the RX 10E/20E.

At least one of the PROGs 10C/10G in the UE 10 is assumed to include program instructions that, when executed by the associated DP 10A, enable the device to operate in accordance with the exemplary embodiments of this invention, as detailed above particularly with respect to FIG. 9C. The eNB/HeNB 20 also has software stored in its MEM 20B to implement certain aspects of these teachings as detailed above particularly with respect to FIG. 9B, and similar for the database system 22 which is summarized above at FIG. 9A. In this regard the exemplary embodiments of this invention may be implemented at least in part by computer software stored on the MEM 10B, 20B, 22B which is executable by the DP 10A of the UE 10 and/or by the DP 20A of the access node/eNB/HeNB 20 or the DP 22A of the database system 22; or by hardware, or by a combination of tangibly stored software and hardware (and tangibly stored firmware). Electronic devices implementing these aspects of the invention may not be the entire UE 10 or the access node/eNB/HeNB 20 or the database system 22, but exemplary embodiments may be implemented by one or more components of same such as the above described tangibly stored software, hardware, firmware and DP, modem, system on a chip SOC or an application specific integrated circuit ASIC.

In general, the various embodiments of the UE 10 can include, but are not limited to personal portable digital devices having wireless communication capabilities, including but not limited to user equipments, cellular telephones, navigation devices, laptop/palmtop/tablet computers, digital cameras and Internet appliances, as well as machine-to-machine devices which operate without direct user action.

Various embodiments of the computer readable MEMs 10B, 20B, 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Depending on the implementation the database system memory 22B may be a disc array. Various embodiments of the DPs 10A, 20A, 22A include but are not limited to general purpose computers, special purpose computers, microprocessors, digital signal processors (DSPs), and multi-core processors.

Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus for facilitating coexistence, comprising:
circuitry including at least one processor connected to at least one memory and configured to:
for at least one channel in license-exempt radio spectrum, derive channel-specific statistical traffic information from a plurality of messages provided by at least a first license-exempt access node which give usage information for the at least one channel;
provide to a second access node that controls licensed radio spectrum the channel-specific statistical traffic information for the at least one channel in the license-exempt radio spectrum; and
receive, from the second access node via a radio access technology that uses the licensed radio spectrum, an access control message for accessing the at least one channel in the license-exempt radio spectrum,
wherein the access control message includes decoding information to decode ongoing communications via a radio access technology that uses the license-exempt radio spectrum, the decoding information including identification of a modulation and encoding scheme,
the radio access technology that uses the license-exempt radio spectrum is different from the radio access technology that uses the licensed radio spectrum, and
the license-exempt radio spectrum includes an industrial, scientific, medical (ISM) band.

2. The apparatus according to claim 1, wherein the derived channel-specific statistical traffic information is specific for a geographic region associated with the first license-exempt access node.

3. The apparatus according to claim 1, wherein each of the plurality of messages comprises a traffic rate and an idle period distribution from which the statistical traffic information is derived.

4. The apparatus according to claim 3, wherein the decoding information includes information for decoding a data frame from the radio access technology that uses the license-exempt radio spectrum, demodulating the data frame, or both.

5. An apparatus for use in a wireless network access node comprising:
circuitry including at least one processor connected to at least one memory and configured to:
retrieve from a local memory channel-specific statistical traffic information for at least one channel in license-exempt radio spectrum;
compile for transmission on licensed radio spectrum an access control message including contents determined from the channel-specific statistical traffic information for aiding a user equipment to access the at least one channel with a probability defined by the contents;
include, in the access control message, decoding information to decode ongoing communications via a radio access technology that uses the license-exempt radio spectrum and is different from a radio access technology that uses the licensed radio spectrum, the decoding information including identification of a modulation and encoding scheme;
and transmit the access control message via the licensed radio spectrum to the user equipment,
wherein the license-exempt radio spectrum includes an industrial, scientific, medical (ISM) band.

6. The apparatus according to claim 5, wherein
the channel-specific statistical traffic information is obtained from a coexistence database system; and
the contents of the downlink message comprises parameters for accessing the at least the one channel, the parameters comprising at least access probability and occupancy time for at least the one channel.

7. The apparatus according to claim 6, wherein the occupancy time is a dwell time for a frame on a cellular radio access technology to be utilized on the at least one channel in the license-exempt radio spectrum, and the access control message is sent by the wireless network access node to the user equipment on the licensed radio spectrum according to the cellular radio access technology.

8. The apparatus according to claim 6, wherein the parameters are determined from the channel-specific statistical traffic information obtained from the coexistence database system in conjunction with usage information of the at least one channel obtained from the user equipment via at least one measurement report.

9. The apparatus according to claim 6, wherein the decoding information includes information for decoding a data frame from the radio access technology that uses the license-exempt radio spectrum, demodulating the data frame, or both.

10. The apparatus according to claim 9, wherein the access control message further comprises pre-schedule information for multiple user equipments to share the at least the one channel in the license-exempt radio spectrum.

11. The apparatus according to claim 5, wherein:
the channel-specific statistical traffic information is for a plurality of channels in license-exempt radio spectrum and is obtained from sensing and measuring the plurality of channels by the wireless access node or from a plurality of uplink messages received from a plurality of user equipments; and
the contents of the downlink message comprises a channel usage rate for each of the plurality of channels, such that each different respective usage rate defines a different probability of access of the respective channel.

12. The apparatus according to claim 11, wherein the circuitry is further configured to
in response to receiving on the licensed radio spectrum from one of the plurality of user equipments an uplink report indicating that the one user equipment has obtained one of the plurality of channels, re-allocate the obtained channel for use by at least the one user equipment.

13. An apparatus for use in a user equipment comprising:
circuitry including at least one processor connected to at least one memory and configured to:
extract contents of an access control message received on licensed radio spectrum, the contents defining a probability for accessing at least one channel in a license-exempt radio spectrum, the access control message further including decoding information to decode ongoing communications via a radio access technology that uses the license-exempt radio spectrum and is different from a radio access technology that uses the licensed radio spectrum, the decoding information including identification of a modulation and encoding scheme; and
attempting to access at least the one channel utilizing the defined probability and the decoding information,
wherein the license-exempt radio spectrum includes an industrial, scientific, medical (ISM) band.

14. The apparatus according to claim 13, wherein:
the contents comprises parameters for accessing at least the one channel, the parameters comprising at least access probability and occupancy time for at least the one channel;
wherein the circuitry is further configured to:
determine from at least a data frame detected on at least the one channel a transition time between a transmit state and an idle state; and
attempt to access at least the one channel is at the transition time utilizing the access probability and for no longer than the occupancy time.

15. The apparatus according to claim 14, wherein the transition time immediately follows an acknowledgement frame that corresponds to the data frame.

16. The apparatus according to claim 14, wherein the access control message is received from a cellular access node, and the circuitry is further configured to
sense at least the one channel in the license-exempt radio spectrum; and
report to the cellular access node via the licensed radio spectrum a measurement report comprising usage information of at least the one channel.

17. The apparatus according to claim 13, wherein:
the access control message is received in the licensed radio spectrum according to a cellular radio access technology; and
the attempted access of at least the one channel in the license-exempt radio spectrum utilizes at least a frame structure of the cellular radio access technology.

18. The apparatus according to claim 13, wherein:
the contents of the access control message comprises a channel usage rate for each of a plurality of channels in the license-exempt radio spectrum, such that each different respective usage rate defines a different probability of access of the respective channel; and
when attempting to access at least the one channel utilizing the defined probability the circuitry calculates for each of the respective plurality of channels a respective channel selection probability and utilizing all the channel selection probabilities to select one of the channels on which the access attempt is made.

19. The apparatus according to claim 18, wherein the circuitry is further configured to:
send to a network access node on the licensed radio spectrum an uplink report indicating that the user equipment has obtained the selected one of the channels on which the access attempt was made.

20. The apparatus according to claim 18, wherein the access control message is a broadcast message received from a network access node; and
the circuitry is further configured to
prior to receiving the downlink message, sense at least two of the plurality of channels and sending to the network access node an uplink measurement report indicating results of the sensing.

* * * * *